United States Patent
Arvanitis

(10) Patent No.: US 11,557,996 B1
(45) Date of Patent: Jan. 17, 2023

(54) METHODS OF REDUCING VIBRATIONS FOR ELECTRIC MOTORS

(71) Applicant: Tula eTechnology, Inc., San Jose, CA (US)

(72) Inventor: Anastasios Arvanitis, San Jose, CA (US)

(73) Assignee: Tula eTechnology, Inc., San Jose, CA (US)

( * ) Notice: Subject to any disclaimer, the term of this patent is extended or adjusted under 35 U.S.C. 154(b) by 0 days.

(21) Appl. No.: 17/846,481

(22) Filed: Jun. 22, 2022

Related U.S. Application Data

(60) Provisional application No. 63/219,467, filed on Jul. 8, 2021.

(51) Int. Cl.
*H02P 21/02* (2006.01)

(52) U.S. Cl.
CPC .................. *H02P 21/02* (2013.01)

(58) Field of Classification Search
CPC ........ H02P 25/032; H02P 25/00; H02P 25/02; H02P 25/022; H02P 25/03; H02P 25/034; H02P 25/04; H02P 25/062; H02P 25/064; H02P 25/08; H02P 25/102; H02P 25/14; H02P 27/00; H02P 27/04; H02P 27/06; H02P 27/08; H02P 27/085; H02P 27/18; H02P 29/00; H02P 29/032; H02P 7/29; H02P 1/00; H02P 1/04; H02P 1/163; H02P 1/18; H02P 1/24; H02P 1/26; H02P 1/30; H02P 1/42; H02P 1/426; H02P 1/46; H02P 1/1465; H02P 4/00; H02P 5/00; H02P 6/00; H02P 6/005; H02P 6/08; H02P 6/26; H02P 6/28; H02P 6/32
See application file for complete search history.

(56) References Cited

U.S. PATENT DOCUMENTS

| | | |
|---|---|---|
| 4,441,043 A | 4/1984 | DeCesare |
| 4,989,146 A | 1/1991 | Imajo |
| 5,099,410 A | 3/1992 | Divan |
| 5,151,637 A | 9/1992 | Takada et al. |
| 5,325,028 A | 6/1994 | Davis |
| 5,483,141 A | 1/1996 | Uesugi |

(Continued)

FOREIGN PATENT DOCUMENTS

| | | |
|---|---|---|
| CN | 1829070 A | 9/2006 |
| CN | 102381265 A | 3/2012 |

(Continued)

OTHER PUBLICATIONS

Cai et al., "Torque Ripple Reduction for Switched Reluctance Motor with Optimized PWM Control Strategy", Energies,; vol. 11, Oct. 15, 2018, pp. 1-27.

(Continued)

*Primary Examiner* — Antony M Paul
(74) *Attorney, Agent, or Firm* — Womble Bond Dickinson (US) LLP

(57) ABSTRACT

A method of controlling an electric motor includes pulsing the electric motor and phase shifting the modulation frequency. Pulsing the electric motor at the modulation frequency propels a vehicle to increase efficiency of the electric motor. Phase shifting the modulation frequency includes phase shifting between 0 degrees and 180 degrees to reduce vibrations induced in the vehicle.

20 Claims, 6 Drawing Sheets

(56) References Cited

U.S. PATENT DOCUMENTS

| | | | |
|---|---|---|---|
| 5,640,073 A | 6/1997 | Ikeda et al. |
| 5,731,669 A | 3/1998 | Shimizu et al. |
| 6,291,960 B1 | 9/2001 | Crombez |
| 6,308,123 B1 | 10/2001 | Ikegaya et al. |
| 6,370,049 B1 | 4/2002 | Heikkil.ang. |
| 6,424,799 B1 | 7/2002 | Gilmore |
| 6,493,204 B1 | 12/2002 | Glidden et al. |
| 6,605,912 B1 | 8/2003 | Bharadwaj et al. |
| 6,829,515 B2 | 12/2004 | Grimm |
| 6,829,556 B2 | 12/2004 | Kumar |
| 6,906,485 B2 | 6/2005 | Hussein |
| 6,940,239 B2 | 9/2005 | Iwanaga et al. |
| 7,190,143 B2 | 3/2007 | Wei et al. |
| 7,259,664 B1 | 8/2007 | Cho et al. |
| 7,327,545 B2 | 2/2008 | Konishi |
| 7,411,801 B2 | 8/2008 | Welchko et al. |
| 7,453,174 B1 | 11/2008 | Kalsi |
| 7,558,655 B2 | 7/2009 | Garg et al. |
| 7,577,511 B1 | 8/2009 | Tripathi et al. |
| 7,616,466 B2 | 11/2009 | Chakrabarti et al. |
| 7,768,170 B2 | 8/2010 | Tatematsu et al. |
| 7,852,029 B2 | 12/2010 | Kato et al. |
| 7,960,888 B2 | 6/2011 | Ai et al. |
| 7,969,341 B2 | 6/2011 | Robbe et al. |
| 3,020,651 A1 | 9/2011 | Zillmer et al. |
| 8,099,224 B2 | 1/2012 | Tripathi et al. |
| 8,768,563 B2 | 7/2014 | Nitzberg et al. |
| 8,773,063 B2 | 7/2014 | Nakata |
| 9,046,559 B2 | 6/2015 | Lindsay et al. |
| 9,050,894 B2 | 6/2015 | Banerjee et al. |
| 9,308,822 B2 | 4/2016 | Matsuda |
| 9,495,814 B2 | 11/2016 | Ramesh |
| 9,512,794 B2 | 12/2016 | Serrano et al. |
| 9,630,614 B1 | 4/2017 | Hill et al. |
| 9,702,420 B2 | 7/2017 | Yoon |
| 9,758,044 B2 | 9/2017 | Gale et al. |
| 9,948,173 B1 | 4/2018 | Abu Qahouq |
| 10,060,368 B2 | 8/2018 | Pirjaber et al. |
| 10,081,255 B2 | 9/2018 | Yamada et al. |
| 10,256,680 B2 | 4/2019 | Hunstable |
| 10,273,894 B2 | 4/2019 | Tripathi |
| 10,291,168 B2 | 5/2019 | Fukuta |
| 10,291,174 B2 | 5/2019 | Irie et al. |
| 10,320,249 B2 | 6/2019 | Okamoto et al. |
| 10,344,692 B2 | 7/2019 | Nagashima et al. |
| 10,381,968 B2 | 8/2019 | Agirman |
| 10,476,421 B1 | 11/2019 | Khalil et al. |
| 10,550,776 B1 | 2/2020 | Leone et al. |
| 10,742,155 B2 | 8/2020 | Tripathi |
| 10,944,352 B2 | 3/2021 | Mazda et al. |
| 11,088,644 B1 | 8/2021 | Carveil |
| 11,133,767 B2 | 9/2021 | Serrano et al. |
| 11,345,241 B1 | 5/2022 | Cai |
| 2001/0039926 A1 | 11/2001 | Kobayashi et al. |
| 2002/0043954 A1 | 4/2002 | Hallidy |
| 2005/0127861 A1 | 6/2005 | McMillan et al. |
| 2005/0151437 A1 | 7/2005 | Ramu |
| 2005/0160771 A1 | 7/2005 | Hosoito et al. |
| 2007/0216345 A1 | 9/2007 | Kanamori |
| 2007/0287594 A1 | 12/2007 | DeGeorge et al. |
| 2008/0129243 A1 | 6/2008 | Nashiki |
| 2008/0179980 A1 | 7/2008 | Dawsey et al. |
| 2009/0045691 A1 | 2/2009 | Ichiyama |
| 2009/0121669 A1 | 5/2009 | Hanada |
| 2009/0128072 A1 | 5/2009 | Strong et al. |
| 2009/0146615 A1 | 6/2009 | Zillmer et al. |
| 2009/0179608 A1 | 7/2009 | Welchko et al. |
| 2009/0306841 A1 | 12/2009 | Miwa et al. |
| 2010/0010724 A1 | 1/2010 | Tripathi et al. |
| 2010/0201294 A1 | 8/2010 | Yuuki et al. |
| 2010/0296671 A1 | 11/2010 | Khoury et al. |
| 2011/0029179 A1 | 2/2011 | Miyazaki et al. |
| 2011/0089774 A1 | 4/2011 | Kramer |
| 2011/0101812 A1 | 5/2011 | Finkle et al. |
| 2011/0130916 A1 | 6/2011 | Mayer |
| 2011/0208405 A1 | 8/2011 | Tripathi et al. |
| 2012/0056569 A1 | 3/2012 | Takamatsu et al. |
| 2012/0112674 A1 | 5/2012 | Schulz et al. |
| 2012/0169263 A1 | 7/2012 | Gallegos-Lopez et al. |
| 2012/0217921 A1 | 8/2012 | Wu et al. |
| 2013/0134912 A1 | 5/2013 | Khalil et al. |
| 2013/0141027 A1 | 6/2013 | Nakata |
| 2013/0226420 A1 | 8/2013 | Pedlar et al. |
| 2013/0241445 A1 | 9/2013 | Tang |
| 2013/0258734 A1 | 10/2013 | Nakano et al. |
| 2014/0018988 A1 | 1/2014 | Kitano et al. |
| 2014/0028225 A1 | 1/2014 | Takamatsu et al. |
| 2014/0130506 A1 | 5/2014 | Gale et al. |
| 2014/0176034 A1 | 6/2014 | Matsumura et al. |
| 2014/0217940 A1 | 8/2014 | Kawamura |
| 2014/0265957 A1 | 9/2014 | Hu et al. |
| 2014/0292382 A1 | 10/2014 | Ogawa et al. |
| 2014/0354199 A1 | 12/2014 | Zeng et al. |
| 2015/0025725 A1 | 1/2015 | Uchida |
| 2015/0240404 A1 | 8/2015 | Kim et al. |
| 2015/0246685 A1 | 9/2015 | Dixon et al. |
| 2015/0261422 A1 | 9/2015 | den Haring et al. |
| 2015/0297824 A1 | 10/2015 | Cabiri et al. |
| 2015/0318803 A1 | 11/2015 | Wu |
| 2016/0114830 A1 | 4/2016 | Dixon et al. |
| 2016/0226409 A1 | 8/2016 | Ogawa |
| 2016/0233812 A1 | 8/2016 | Lee et al. |
| 2016/0269225 A1 | 9/2016 | Kirchmeier et al. |
| 2016/0373047 A1 | 12/2016 | Loken et al. |
| 2017/0087990 A1 | 3/2017 | Neti et al. |
| 2017/0163108 A1 | 6/2017 | Schencke et al. |
| 2017/0331402 A1 | 11/2017 | Smith et al. |
| 2018/0032047 A1 | 2/2018 | Nishizono et al. |
| 2018/0045771 A1 | 2/2018 | Kim et al. |
| 2018/0154786 A1 | 6/2018 | Wang et al. |
| 2018/0276913 A1 | 9/2018 | Garcia et al. |
| 2018/0323665 A1 | 11/2018 | Chen et al. |
| 2018/0334038 A1 | 11/2018 | Zhao et al. |
| 2019/0058374 A1 | 2/2019 | Enomoto et al. |
| 2019/0288629 A1 | 9/2019 | Tripathi |
| 2019/0288631 A1 | 9/2019 | Tripathi |
| 2019/0341820 A1 | 11/2019 | Krizan et al. |
| 2020/0212834 A1 | 7/2020 | Mazda et al. |
| 2020/0262398 A1 | 8/2020 | Sato et al. |
| 2020/0328714 A1 | 10/2020 | Tripathi |
| 2020/0343849 A1 | 10/2020 | Coroban-Schramel |
| 2020/0366223 A1 | 11/2020 | Coroban-Schramel |
| 2021/0203263 A1 | 7/2021 | Serrano et al. |
| 2021/0351733 A1 | 11/2021 | Carvell |

FOREIGN PATENT DOCUMENTS

| | | | |
|---|---|---|---|
| CN | 104716754 A | 6/2015 | |
| CN | 204589885 U | 8/2015 | |
| CN | 105196877 A | 12/2015 | |
| CN | 205229379 U | 5/2016 | |
| CN | 106932208 A | 7/2017 | |
| CN | 107067780 A | 8/2017 | |
| CN | 207129052 U | 3/2018 | |
| CN | 108216026 A | 6/2018 | |
| CN | 108445386 A | 8/2018 | |
| CN | 110212725 A | 9/2019 | |
| DE | 102014206342 A1 | 10/2015 | |
| EP | 2605398 A1 | 6/2013 | |
| FR | 2989479 B1 | 3/2014 | |
| JP | 10-243680 A | 9/1998 | |
| JP | 2008-079686 A | 4/2008 | |
| JP | 2009-065758 A | 3/2009 | |
| JP | 2014-033449 A | 2/2014 | |
| JP | 2017-011970 A | 1/2017 | |
| JP | 2017-200382 A | 11/2017 | |
| JP | 2018-033250 A | 3/2018 | |
| KR | 10-2010-0021146 A | 2/2010 | |
| KR | 10-2017-0021146 A | 2/2017 | |
| KR | 10-2017-0032976 A | 3/2017 | |
| RU | 2543503 C1 * | 3/2015 | ............. H02P 23/26 |
| RU | 2543503 C1 | 3/2015 | |

(56) References Cited

FOREIGN PATENT DOCUMENTS

| WO | 03/36787 A1 | 5/2003 |
| WO | 2012-010993 A2 | 1/2012 |

OTHER PUBLICATIONS

Carvell et al., U.S. Appl. No. 17/204,269, filed Mar. 17, 2021.
Carvell, U.S. Appl. No. 16/866,917, filed May 5, 2020.
Carvell, U.S. Appl. No. 17/188,189, filed Mar. 1, 2021.
Islam, U.S. Appl. No. 17/220,228, filed Apr. 1, 2021.
Luckjiff et al., "Hexagonal$Sigma Delta$Modulators in Power Electronics", IEEE Transactions on Power Electronics,; vol. 20, No. 5, Sep. 2005, pp. 1075-1083.
Mirzaeva et al., "The use of Feedback Quantizer PWM for Shaping Inverter Noise Spectrum", Power Electronics and; Motion Control Conference (EPE/PEMC), 2012 15th International IEEE, Sep. 4, 2012, pages DS3c. 10-1, XP032311951, DOI: 10.1109/EPEPEMC.2012.6397346, ISBN: 978-1-4673-1970.6.
Ramsey, "How this father and son's new electric turbine could revolutionize electric cars; The Hunstable Electric; Turbine can produce up to three times the torque of any other motor", Available Online at; <https://www.autoblog.com/2020/03/08/hunstable-electric-turbine/>, Mar. 8, 2020, 9 pages.
Serrano et al., U.S. Appl. No. 16/689,450, filed Nov. 20, 2019.
Spong et al., "Feedback Linearizing Control of Switched Reluctance Motors", IEEE Transactions on Automatic; Control, vol. AC-32, No. 5, May 1987, pp. 371-379.
Srinivasan, U.S. Appl. No. 17/158,230, filed Jan. 26, 2021.
Srinivasan, U.S. Appl. No. 17/188,509, filed Mar. 1, 2021.
Tripathi, U.S. Appl. No. 16/353,159, filed Mar. 14, 2019.
Tripathi, U.S. Appl. No. 16/912,313, filed Jun. 25, 2020.
Tripathi, U.S. Appl. No. 16/353,166, filed Mar. 14, 2019.
International Search Report and Written Opinion for PCT Application No. PCT/IB2022/055851, dated Sep. 1, 2022, 6 pgs.

\* cited by examiner

METHODS OF REDUCING VIBRATIONS FOR ELECTRIC MOTORS

BACKGROUND

1. Technical Field

The present disclosure relates to methods of reducing vibrations for electric motors, and more specifically, to reducing vibration of pulsed electric motors by phase shifting the pulses of the electric motors.

2. Discussion of Related Art

Electric motors are known to be efficient at providing continuous torque to driven equipment. The torque delivery of electric motors is typically continuous without the pulsations associated with an internal combustion engine. Generally, electric motors have an optimal efficiency point in mid-low to mid-high range of torque relative to a maximum torque of the electric motor. For example, the maximum efficiency of an electric motor may be in a range of 30% to 80% of the maximum torque of the electric motor.

When an electric motor provides a continuous torque in a low range of the maximum torque of the electric motor, e.g., below 20% of the maximum torque, the efficiency of the electric motor is typically low. It has been found that reducing a duty cycle of the electric motor by pulsing the electric motor at the optimal efficiency point can provide a target torque in a low range of the electric motor at a higher efficiency than providing a continuous torque from the electric motor. The pulsing of the electric motor at the optimal efficiency point includes delivering pulses at a modulation frequency.

The pulsing of the electric motor at a modulation frequency can induce vibrations in equipment driven by the electric motor. For example, when the electric motor is driving a vehicle, the pulsing of the electric motor can create vibrations in the structure of the vehicle. These vibrations can be amplified when the modulation frequency is near a natural frequency resonance of the vehicle structure.

SUMMARY

This disclosure relates generally to methods of modifying a modulation frequency of an electric motor to reduce or cancel vibrations resulting from pulsing of the electric motor. The method may include phase shifting and/or time shifting the modulation frequency to reduce or cancel vibrations resulting from pulsing of the electric motor.

In an embodiment of the present disclosure, a method of controlling an electric motor includes pulsing the electric motor and phase shifting the modulation frequency. Pulsing the electric motor at the modulation frequency reduces a duty cycle of the electric motor to increase efficiency of the electric motor. Phase shifting the modulation frequency includes phase shifting between 0 degrees and 180 degrees to reduce vibrations induced in the driven equipment.

In embodiments, the phase shifting occurs when the modulation frequency is within a resonance range of the driven equipment. The resonance range may be defined within 10 Hertz (Hz) of a resonance frequency of the driven equipment.

In some embodiments, pulsing the electric motor incudes pulsing the electric motor at a pulse torque to deliver a target torque less than the pulse torque. Pulsing the electric motor at the pulse torque may include the pulse torque being an optimal efficiency point of the electric motor.

In certain embodiments, the method includes varying the modulation frequency to generate a target torque. Phase shifting the modulation frequency occurs when the modulation frequency is below 100 Hz. Phase shifting may include phase shifting the modulation frequency at a shifting frequency. Phase shifting the modulation frequency may include the shifting frequency being greater than the modulation frequency.

In particular embodiments, the method may include time shifting peaks of the phase shifted modulation frequency to level torque delivery of the electric motor. Pulsing the electric motor at the modulation frequency may propel a vehicle such that the driven equipment is a drive shaft of the vehicle.

In another embodiment of the present disclosure, a non-transitory computer-readable medium has instructions stored thereon that, when executed by a controller, causes the controller to pulse an electric motor at a modulation frequency to reduce a duty cycle of the electric motor to deliver a target torque and increase efficiency of the motor and phase shift the modulation frequency between 0 degrees (0 radians) and 180 degrees ($\pi$ radians) to reduce vibrations resulting from pulsing the electric motor.

In embodiments, the phase shifting occurs when the modulation frequency is within a resonance range of a structure to which the electric motor is mounted or a component driven by the electric motor. Pulsing the electric motor may include pulsing the electric motor at a pulse torque to deliver a target torque less than the pulse torque. Pulsing the electric motor at the pulse torque may include the pulse torque being an optimal efficiency point of the electric motor.

In some embodiments, the instructions further cause the controller to vary the duty cycle to generate a target torque. Phase shifting the modulation frequency may occur when the modulation frequency is below 100 Hz.

In certain embodiments, phase shifting includes phase shifting the modulation frequency at a shifting frequency. The shifting frequency may be greater than the modulation frequency.

In particular embodiments, the instructions further cause the controller to time shift peaks of the phase shifted modulation frequency to level torque delivery of the electric motor.

In another embodiment of the present disclosure, a controller to operate an electric motor to rotate a driven component includes a processor and a memory including a program to cause the processor to pulse the electric motor at a modulation frequency to reduce a duty cycle and to increase efficiency of the electric motor to deliver a target torque to the driven component and phase shrift the modulation frequency between 0 degrees (0 radians) and 180 degrees ($\pi$ radians) at a shifting frequency.

In embodiments, the phase shifting occurs when the modulation frequency is within a resonance range, the resonance range may be stored in the memory of the controller. Pulsing the electric motor may include pulsing the electric motor at a pulse torque to deliver a target torque that is less than the pulse torque.

In some embodiments, the program may further cause the processor to vary the modulation frequency to generate a target torque. Phase shifting may include phase shifting the modulation frequency at a shifting frequency. The program may further cause the processor to time shift peaks of the phase shifted modulation frequency to level torque delivery of the electric motor.

In another embodiment of the present disclosure, a drive system discloses a structure, a driven component, an electric motor fixed to the structure for rotating the driven component, and a controller. The controller configured to operate the electric motor to rotate the driven component. The controller including a processor and a memory including a program. The program causes the processor to pulse the electric motor at a modulation frequency to deliver a target torque to the driven component and to phase shift the modulation frequency between 0 degrees (0 radians) and 180 degrees (π radians) at a shifting frequency to reduce vibrations within the structure.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are incorporated in and constitute a part of this specification, wherein.

DETAILED DESCRIPTION

Figure 1:
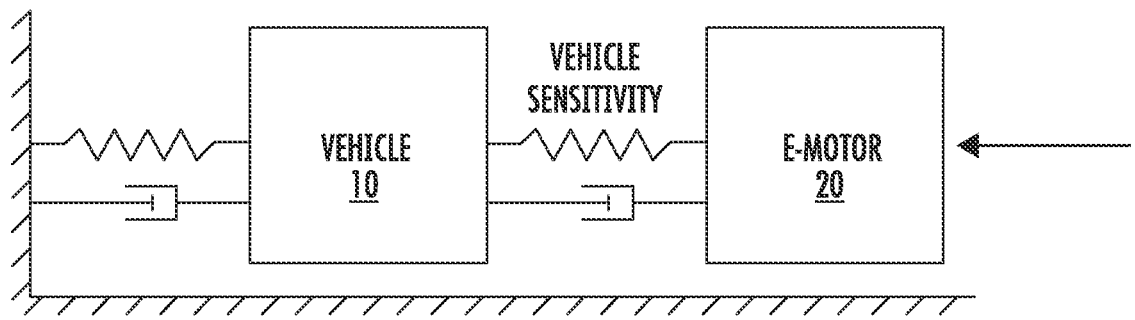
FIG. 1 is a schematic view of an electric motor mounted to a structure of a vehicle to model a response to the vibrations of the torque delivery of the electric motor.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing or engineering tolerances or the like.

To increase efficiencies of an electric motor in a low torque range of the electric motor, the electric motor may be pulsed to reduce a duty cycle of the electric motor to provide a target torque or demand torque as an average torque delivered over time by pulsing the electric motor at an optimal efficiency point at a modulation frequency. This pulsing of the electric motor may have a Pulse Width Modulation (PWM) waveform for torque delivery. The duty cycle is selected to provide a low target torque to the driven equipment while pulsing the electric motor at the optimal efficiency point. The modulation frequency may be selected to satisfy noise, vibration, and harshness (NVH) requirements and to reduce or minimize transition losses. In certain embodiments, the modulation frequency is selected based on a torsional vibration of the driven equipment For example, an electric motor may be pulsed at an efficient torque of 200 Nm with a 20% duty cycle to prove a target torque of 40 Nm to driven equipment. Depending on the NVH characteristics of the driven equipment, the 200 Nm pulses may be delivered at a 30 Hz modulation frequency. In an exemplary electric motor, in certain operating condition, pulsing the electric motor to lower a duty cycle to deliver the target torque has been shown to be 9% more efficient than the electric motor providing torque demanded through continuous torque delivery.

Generally, electric motors provide a substantially continuous torque. As a result, electric motors typically may be directly mounted to structure and are directly coupled to driven equipment. This is different from internal combustion motors that are typically mounted to structure by one or more vibration isolating mounts to reduce the transfer of vibrations from the motor to the structure. Similarly, internal combustion motors may include vibration isolating elements, e.g., a flywheel, such that the pulsations in torque delivery from the internal combustion motor are isolated from being transferred to the driven equipment. As a result of being directly mounted to structure and the driven equipment, pulsing an electric motor at a modulation frequency may result in undesirable vibrations being transmitted to structure and/or driven equipment. In particular, the torsional vibrations as a result of pulsing the electric motor may result in undesirable vibrations in structure and/or driven equipment. In some embodiments, electric motors may be mounted with compliant mounts that isolate some vibration from the electric motor.

Figure 2:
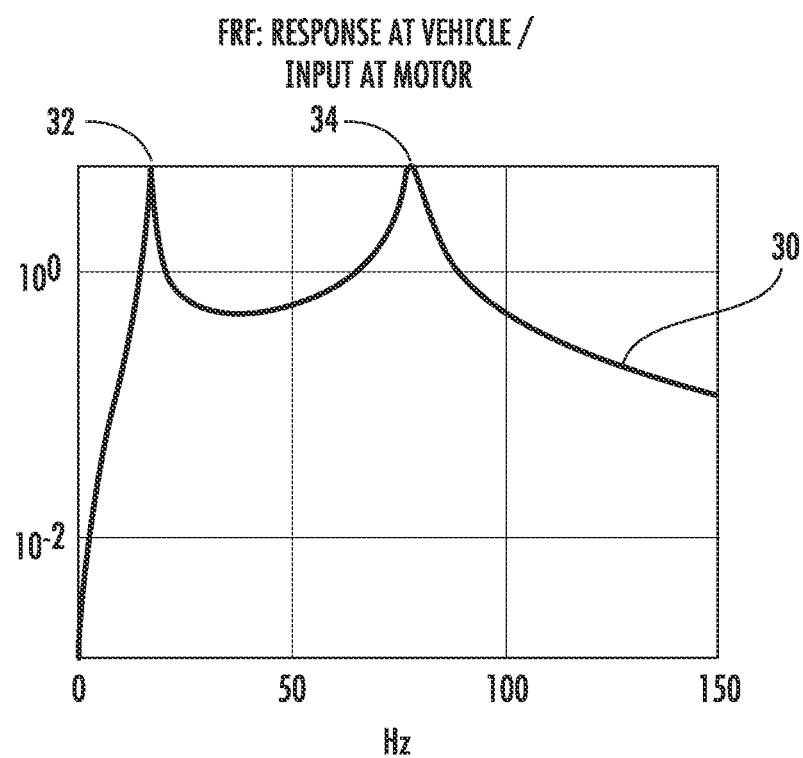
FIG. 2 is a chart showing an exemplary frequency response of the structure of the vehicle of FIG. 1.

With reference to FIGS. 1-4, the result of a modulation frequency being at a natural resonant frequency of the structure of a vehicle are modeled. FIG. 1 shows a simplified model of a vehicle 10 being driven by a pulsed electric motor 20. FIG. 2 shows an exemplary model of a frequency response of the vehicle 10 over a range of frequencies including two natural resonant frequencies 32, 34. The natural resonances of the structure of the vehicle 10 have peaks or natural resonant frequencies at 17 Hz and 77 Hz.

Figure 3:
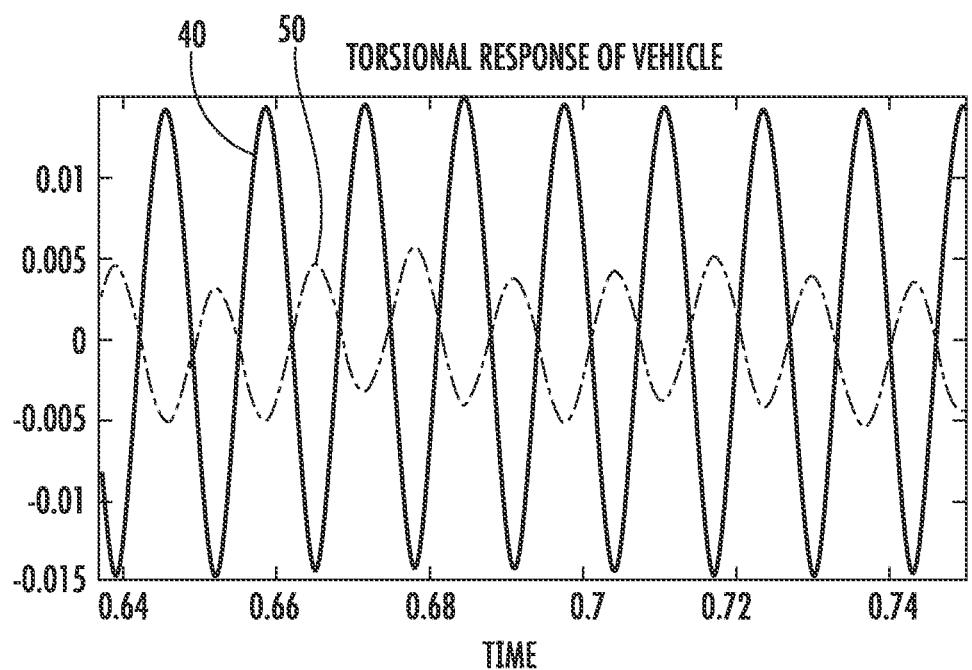
FIG. 3 is a graph of a torsional response of the vehicle of FIG. 1 in view of pulsed torque delivery of the electric motor at a natural resonant frequency of the structure of the vehicle with and without a vibration cancellation feature provided in accordance with an embodiment of the present disclosure at the natural resonant frequency of the structure of the vehicle of FIG. 1.
Figure 4:
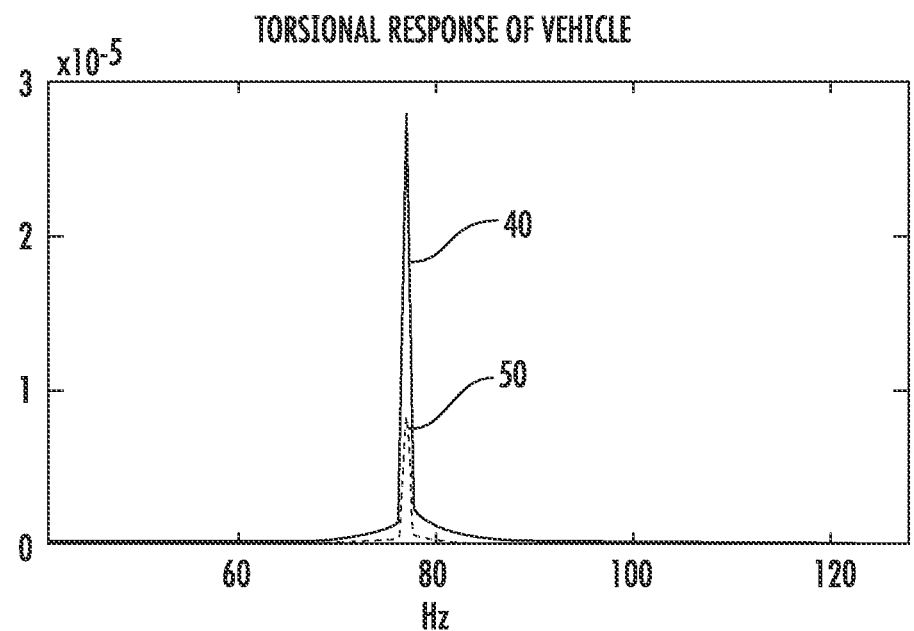
FIG. 4 is a graph of the torsional response of the vehicle of FIG. 1 in view of pulsed torque delivery of the electric motor at a natural resonant frequency of the structure of the vehicle with and without a vibration cancellation feature provided in accordance with an embodiment of the present disclosure across a range of frequencies.

FIGS. 3 and 4 show the modeled torsional response of the vehicle 10 when the electric motor 20 is pulsed at one of the natural resonant frequencies, e.g., 77 Hz. The torsional response of the vehicle 10 is significant and matches the modulation frequency of the electric motor 20. Also shown in FIG. 4, the torsional response of the vehicle 10 is substantially isolated to the modulation frequency of 77 Hz.

When an electric motor, e.g., electric motor 20, is used to propel or drive a vehicle 10, peaks in a torsional response of the vehicle 10 may result in undesirable vibrations being felt by passengers of the vehicle 10. The undesirable vibrations may also cause premature wear or failure of components of the vehicle 10. For example, undesirable vibrations in components of the drive train may result in premature wear and/or failure of these components. As such, it is desirable to reduce the amplitude of or eliminate the undesirable vibrations of the vehicle 10 and/or the drivetrain.

As detailed above, pulsing the electric motor 20 at an optimal efficiency point at a modulation frequency to reduce the duty cycle of the electric motor 20 allows for the delivery of a target torque below the optimal efficiency point at a higher efficiency than continuously providing the target torque from the electric motor 20. The low target torque may be in a range of 0 percent to 40 percent of the optimal efficiency point of the electric motor 20. The target torque delivered by the electric motor 20 can be controlled by increasing or decreasing the duty cycle of an excitation torque at which the electric motor 20 is pulsed or excited. The excitation torque may be selected to be an optimal efficiency point for the electric motor 20 and may be in a range of 50 percent to 80 percent, e.g., 60 percent, of the maximum torque of the electric motor 20.

With the excitation torque fixed at an optimal efficient point of the electric motor 20, the torque delivered by the electric motor 20 can be controlled by adjusting the duty cycle of the electric motor 20. For example, the duty cycle can be increased to increase the torque delivered and the duty cycle can be decreased to lower the torque delivered. The modulation frequency can be increased or decreased as the duty cycle changes based on NVH characteristics of the driven equipment. In some embodiments, a lower modulation frequency may reduce transition losses of the electric motor 20 as the electric motor 20 is pulsed.

The electric motor 20 may provide a continuous torque when the target torque is near the optimal efficiency point of the electric motor 20, for example, when the target torque is within 20% of the optimal efficiency point. When the target torque is more than 20% below the optimal efficiency point, a controller of the electric motor 20 may reduce the duty cycle of the electric motor 20 by pulsing the electric motor 20 at the optimal efficiency point to provide the target torque. The controller may reduce the duty cycle to decrease the torque delivered to the target torque.

Figure 5:
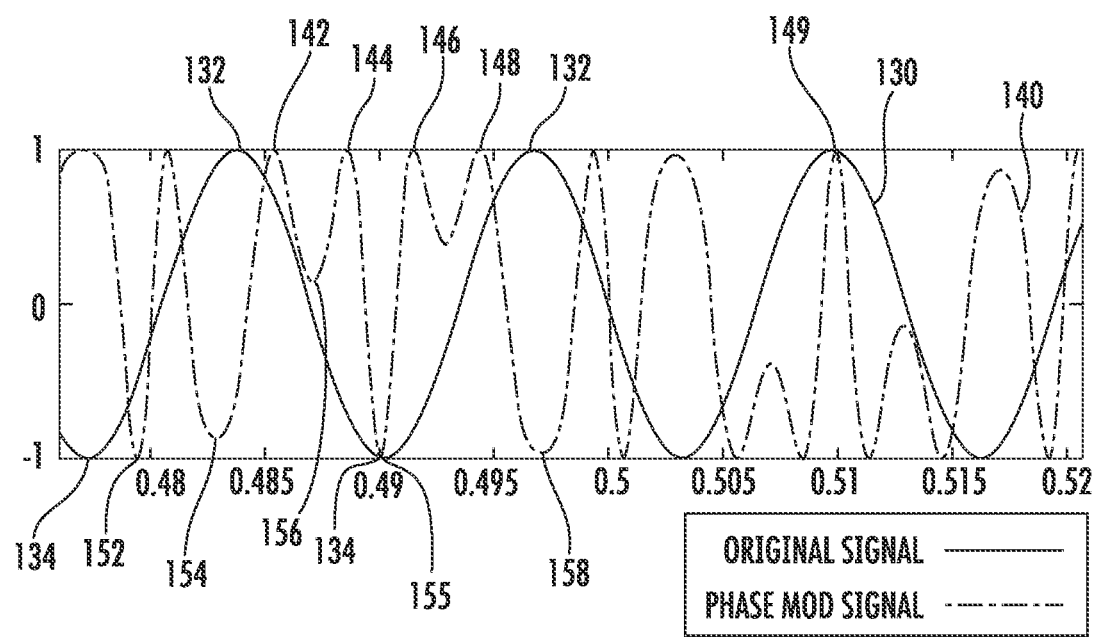
FIG. 5 is a chart of a phase modified control signal provided in accordance with an embodiment of the present disclosure imposed over an unmodified control signal to pulse an electric motor.

Referring now to FIGS. 3-5, a method of canceling vibrations from pulsing an electric motor is detailed in accordance with the present disclosure. The method of canceling vibration can be executed in a controller of the electric motor 20 without the need for vibration mitigation hardware, e.g., vibration isolating engine mounts or a fly wheel. The method includes phase shifting the modulation frequency at a shifting frequency such that vibration induced by pulsing the electric motor 20 at its modulation frequency is reduced or completely canceled. The shifting frequency may interact with the modulation frequency of the electric motor 20 and introduce lower frequency content so that the selection of the shifting frequency is done in such a way that the overall torsional vibration response of the driven equipment is minimized compared to steady phase pulsation while operating within the limitations of the inverter and maintaining the efficiency gains from pulsing the electric motor 20. In the examples below, the modulation frequency is phase shifted between 0 degrees (0 radians) and 180 degrees ($\pi$ radians) at the shifting frequency. In some embodiments, the modulation frequency may be phase shifted between different phases or be phase shifted between more than two frequencies. To phase shift the modulation frequency, the controller of the electric motor can control the timing of the current switching of the electric motor. The method of canceling vibrations may be active whenever the controller pulses the electric motor or may only be active when pulsing the electric motor 20 would result in unacceptable NVH of the driven equipment.

With particular reference to FIG. 5, a phase shifted modulation signal 140 is shown relative to the original modulation signal 130 with the modulation frequency being 77 Hz and the shifting frequency being 100 Hz. As shown, the phase shifted modulation signal 140 provides similar torque to the original modulation signal 130. The phase shifted modulation signal 140 has some peaks 155, 149 that align with the peaks 132, 134 of the original modulation signal 130 and some peaks 158 that are in direct opposition from the peaks 132 of the original modulation signal 130. In addition to matching or opposing the peaks of the original modulation signal 130, the phase shifted modulation signal has additional peaks, e.g., peaks 142, 144, 146, 148, 152, 154, 158, that are between peaks of the original modulation signal 130.

With additional reference back to FIGS. 3 and 4, phase shifting the original modulation signal 130 as represented by the phase shifted modulation signal 140 such that even at a resonant frequency of the vehicle, vibrations induced by pulsing the electric motor 20 are significantly reduced when compared to the original modulation signal 130. As shown in FIG. 3, the torsional response 50 of the vehicle 10 to the phase shifted modulation signal 140 is between one quarter to one third the amplitude or magnitude when compared to the torsional response 40 of the vehicle 10 to the original modulation signal 130. Also apparent is the reduction in amplitude or magnitude of the peak torsional response 50 to the phase shifted modulation signal 140 of FIG. 4 by approximately 75% from the peak of the torsional response 40 of the vehicle to the original modulation signal 130.

With particular reference to FIG. 5, the phase shifted modulation signal 140 may have lulls or plateaus that result in uneven torque delivery. This uneven torque delivery may result in a noticeable jerk or lag in torque delivery such that the torque delivery is outside desirable NVH characteristics. The method may include time shifting portions of the phase shifting to even out the torque delivery to make the torque deliver more consistent to eliminate any noticeable jerks or lags in the torque delivery.

As shown in FIG. 5, the phase delay signal is a sinusoidal wave. It some embodiments, the phase shifting may have a trapezoidal form such as a PWM waveform with a transition ramp. The frequency of the phase delay $f_p$ may be modeled by the following equation:

$$f_p = \frac{1}{2a + \frac{1}{r}} f_m$$

where the frequency of the phase delay $f_p$ is based on the original modulation frequency $f_m$ with the number of cycles between phase shifts represented as "a" and the phase shift transition rate being represented by "r". While a sinusoidal and PWM waveform are described herein, other waveforms are contemplated without deviating from the scope of this disclosure.

Figure 6:
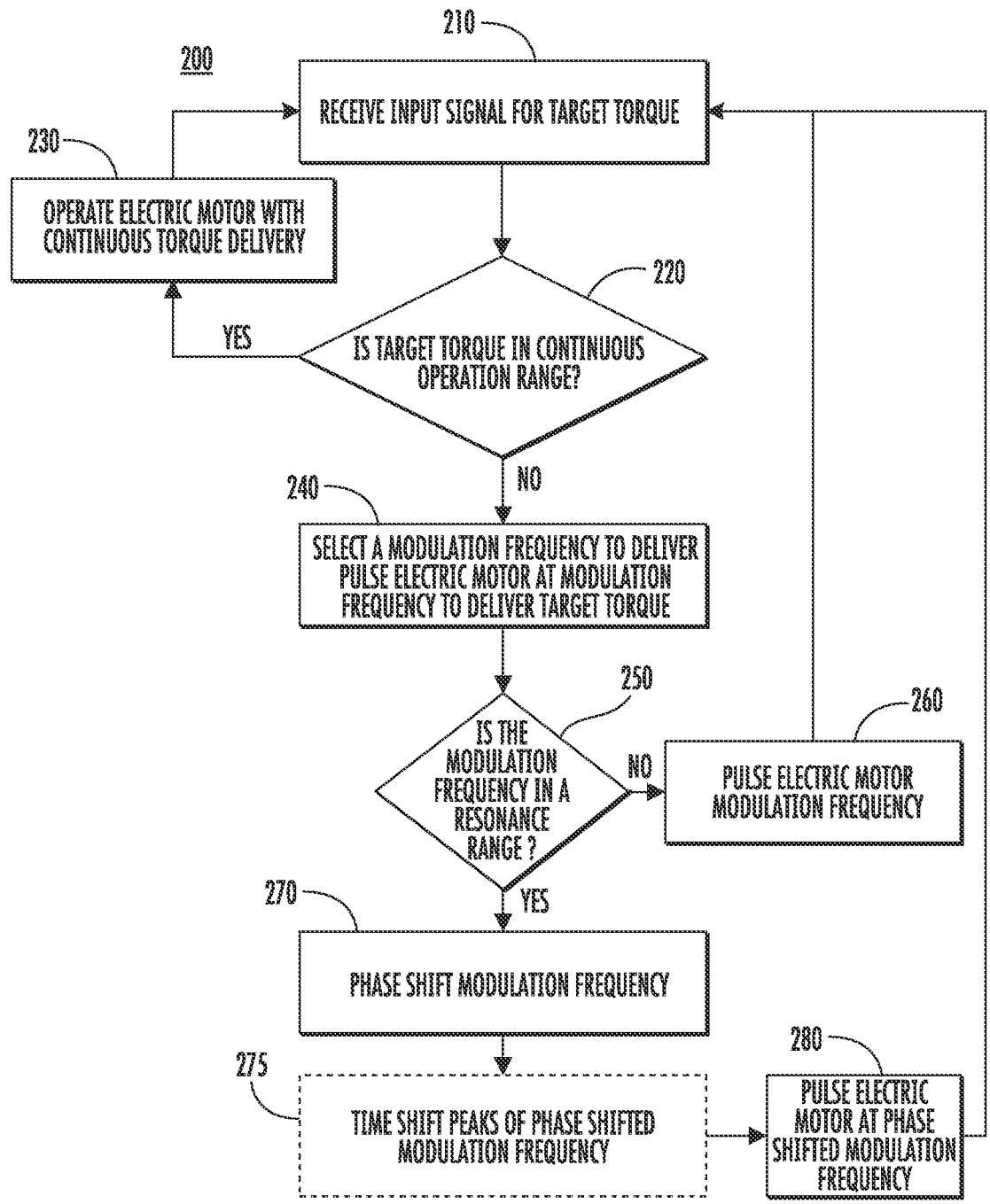
FIG. 6 is a flow chart of a method of controlling an electric motor provided in accordance with an embodiment of present disclosure.
Figure 7:
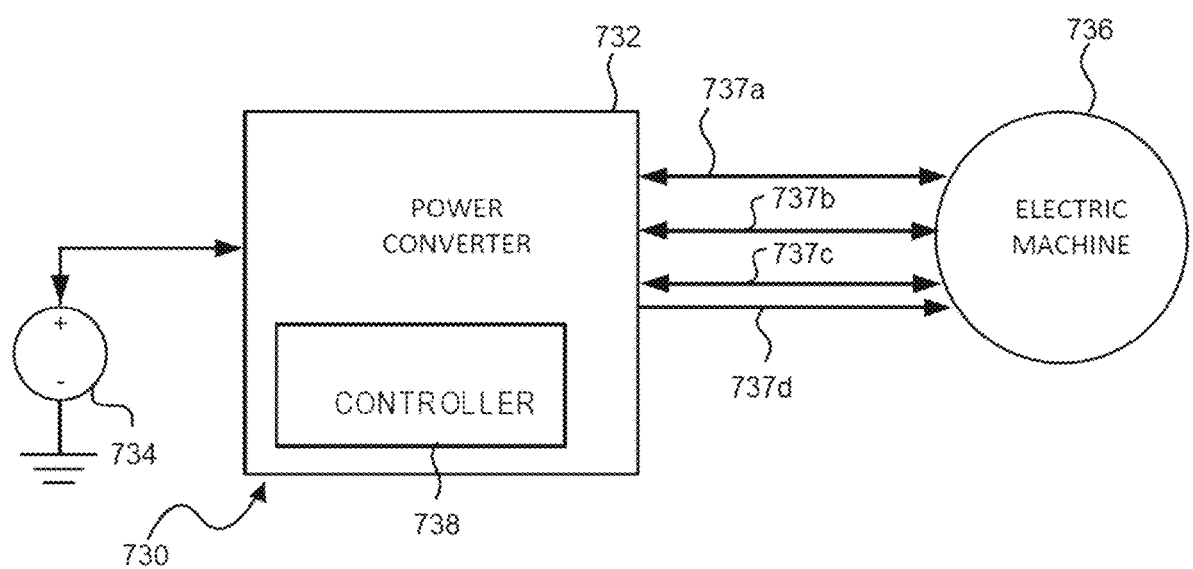
FIG. 7 illustrates an example pulsed controlled electric motor in accordance with the present disclosure.

Referring now to FIG. 6, a method of controlling an electric motor is disclosed in accordance with the present disclosure and is referred to generally as method 200. The method 200 is executed on a controller that provides signals to an electric motor to deliver a target torque to a drive component. The method 200 is described in accordance with the model of an electric motor 20 and vehicle 10 of FIG. 1. However, the drive component may be a driveshaft or axle of a vehicle or may be a driveshaft to rotate a piece of equipment.

The method 200 may include a controller of the electric motor 20 receiving an input signal requesting a target torque from the electric motor 20 (Step 210). The controller analyzes the requested target torque to determine if the target torque is within a continuous operation range of the electric motor 20 (Step 220). The continuous operation range may be a range of torques that are at or above the optimal efficiency point of the electric motor 20. The continuous operation range may include a range of torques that are below the optimal efficiency point of the electric motor 20. For example, when the optimal efficiency point of the electric motor 20 is 60% of the maximum torque of the electric motor 20, the continuous operation range may be from 40% to 100% of the maximum torque of the electric motor 20.

When the requested target torque is within continuous operation range, the controller operates the electric motor 20 to deliver the target torque as a continuous torque (Step 230).

When the requested target torque is below the continuous operation range, the controller selects a modulation frequency to pulse the electric motor 20 to deliver the target torque (Step 240). As detailed above, the modulation frequency is selected such that the electric motor 20 can be pulsed at the optimal efficiency point to deliver the target torque. The duty cycle is adjusted to set the torque delivered from the electric motor 20 to the target torque while pulsing the electric motor 20 at the modulation frequency. For example, to increase a torque delivered from the electric motor 20, the duty cycle is increased and to decrease a torque delivered from the electric motor 20, the duty cycle is decreased. As the duty cycle is increased or decreased, the modulation frequency may be increased or decreased based on the NVH characteristics of the driven equipment, e.g., the vehicle.

With the modulation frequency selected, the controller analyzes the modulation frequency in view of the resonance frequencies of the structure that the electric motor 20 is mounted to and the resonance frequencies of the driven equipment, e.g., a structure of a vehicle and/or driven components of the vehicle, to determine if the modulation frequency is in a resonance range (Step 250). The resonance range may be one or more range of frequencies at or near resonances of the structure supporting the electric motor 20 or equipment driven by the electric motor 20. The resonance range may be any frequency or may be defined as within a predefined frequency of the resonances of the structure or driven equipment. Using the example above with resonances at 17 Hz and 77 Hz the resonance range may be within 10 Hz of the resonances such that the resonance range is 7 Hz to 27 Hz and 67 Hz to 87 Hz. In some instances, the resonance range may vary with the frequency of the resonance. For example, using the same resonances of 17 Hz and 77 Hz, the resonance range may be 7 Hz to 27 Hz and 57 Hz to 97 Hz. The resonance range may vary as a percentage of each of the resonant frequencies. In some embodiments, the resonance range may be defined as when the modulation frequency is below a threshold frequency. For example, the threshold frequency of the resonance range may be 100 Hz such that when the modulation frequency is at or below 100 Hz, the modulation frequency is modified or phase shifted. When the modulation frequency is outside of the resonance range, the controller may operate the electric motor 20 at the modulation frequency without modifying the modulation frequency (Step 260).

When the modulation frequency is within the resonance range, the controller operates the electric motor 20 at a modified or phase shifted modulation frequency (Step 280). To modify the modulation frequency, the controller activates a vibration control program or algorithm to phase shift the modulation frequency (Step 270). The vibration control program or algorithm includes the controller adjusting the timing of the current switching of the electric motor 20 to phase shift the modulation frequency at a shifting frequency. As noted above, the shifting frequency may be greater than the modulation frequency, may be less than the modulation frequency, or may be the same as the modulation frequency. In some embodiments, the shifting frequency may be constant or may change as the modulation frequency changes. The phase shifting of the modulation frequency may decrease an amplitude of or prevent vibrations in the structure or driven equipment as a result of pulsing the electric motor 20 as shown in FIG. 5. In certain embodiments, the phase shifting the modulation frequency may create an uneven torque delivery in the phase shifted modulation frequency. The controller may include a time shifting algorithm that time shifts peaks of the phase shifted modulation frequency to deliver torque more consistently and eliminate any noticeable jerks of lags in the torque delivery (Step 275).

The controller detailed above may be a standalone controller or may be part of another controller. The controller includes a processor and a memory. The controller may also include an input to receive input such as a desired torque. The controller includes a motor output that is in signal communication with an electric motor to operate the electric motor to provide a target torque. The methods detailed above may be stored in the memory of the controller as a non-transitory computer-readable medium that when executed on the processor of the controller cause the controller to execute the methods detailed above including method 200.

Referring to FIG. 4, a diagram of a power controller 730 for pulsed operation of an electric motor is illustrated. The power controller 730 includes a power converter 732, a DC power supply 734, and an electric motor 736. In this non-exclusive embodiment, the power converter 732 comprises a controller 738. The power converter 732 may be operated as a power inverter. The power converter 732 is responsible for generating three-phased AC power from the DC power supply 734 to drive the electric motor 736. The three-phased input power, denoted as phase A 737a, phase B 737b, and phase C 737c, is applied to the windings of the stator of the electric motor 736 for generating the RMF. The line depicting the field current, 737d carries a DC field current that typically is unidirectional.

The controller 738 is responsible for selectively pulsing the three-phased input power. During conventional (i.e., continuous) operation, the three-phased and field coil input power is continuous or not pulsed. On the other hand, during pulsed operation, the three-phased and field coil input power is pulsed. Pulsed operation may be implemented, in non-exclusive embodiments, using any of the approaches described herein, such as but not limited to the approaches described below.

Figure 8:
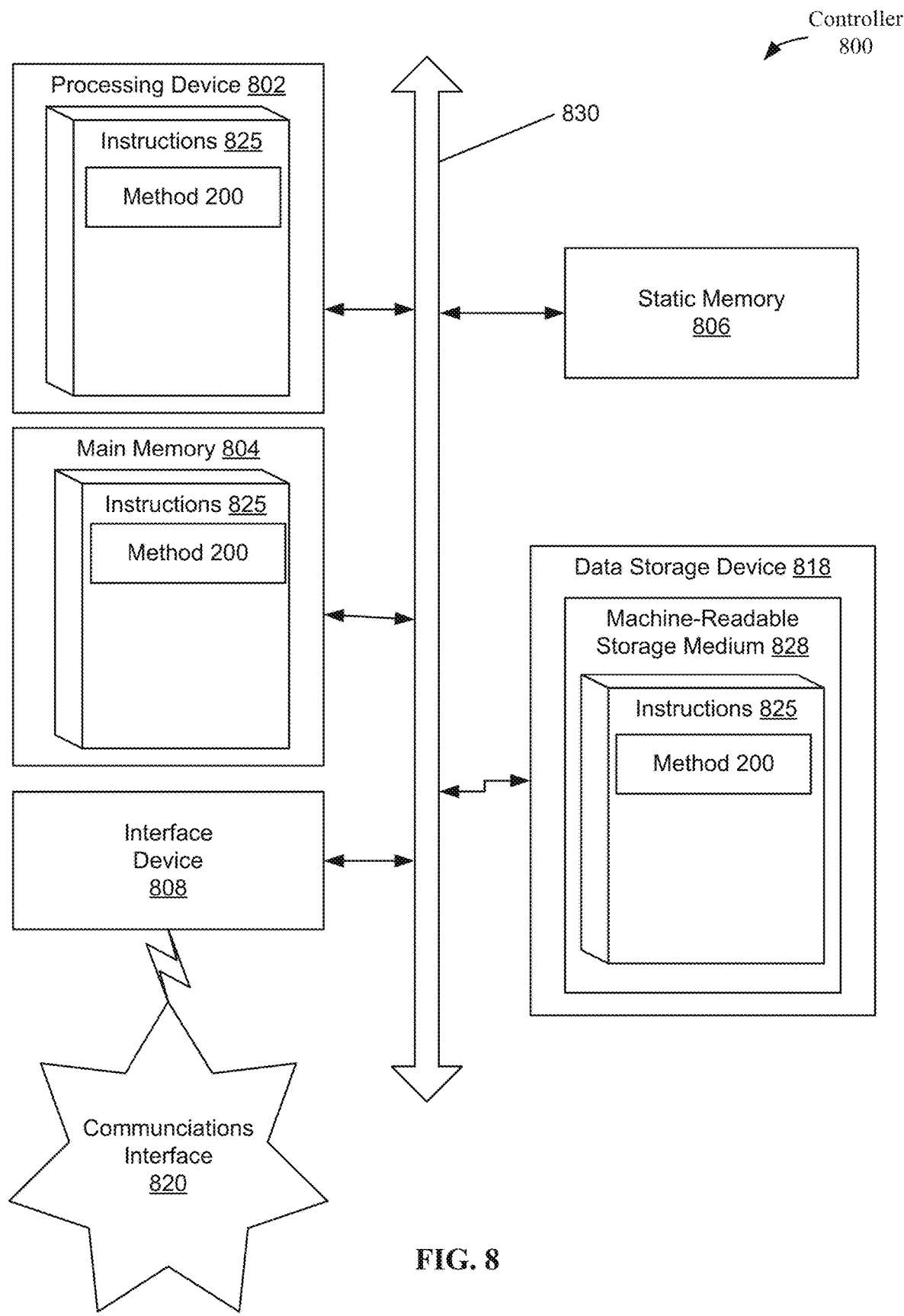
FIG. 8 is a block diagram of an example controller that may perform one or more of the operations described herein.

FIG. 8 is a block diagram of an example controller 800 that may perform one or more of the operations described herein, in accordance with some embodiments. For example, the controller 800 may be used as the controller 738 detailed above. The controller 800 may be in signal communication with other computing devices or controllers by being integrated therewithin or connected via a LAN, an intranet, an extranet, and/or the Internet. In some embodiments, while only a single controller is illustrated, the term "controller" may be taken to include any collection of controllers that individually or jointly execute a set (or multiple sets) of instructions to perform the methods discussed herein.

The example controller 800 may include a processing device (e.g., a general purpose processor, a PLD, etc.) 802, a main memory 804 (e.g., synchronous dynamic random access memory (DRAM), read-only memory (ROM)), a static memory 806 (e.g., flash memory and a data storage device 818), which may communicate with each other via a bus 830.

Processing device 802 may be provided by one or more general-purpose processing devices such as a microprocessor, central processing unit, or the like. In an illustrative example, processing device 802 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 802 may comprise one or more special-purpose processing devices such as an application specific integrated circuit (ASIC), a field programmable gate array (FPGA), a digital signal processor (DSP), network processor, or the like. The processing device 802 may be configured to execute the operations described herein, in accordance with one or more aspects of the present disclosure, for performing the operations and steps discussed herein.

The data storage device 818 may include a computer-readable storage medium 828 on which may be stored one or more sets of instructions 825 that may include instructions for one or more components (e.g., the electric motor 736) for carrying out the operations described herein, in accordance with one or more aspects of the present disclosure. Instructions 825 may reside, completely or at least partially, within main memory 804 and/or within processing device 802 during execution thereof by computing device 800, main memory 804 and processing device 802 constituting computer-readable media. The instructions 825 may be transmitted or received over a communication interface 820 via interface device 808.

While computer-readable storage medium 828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" may be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Examples described herein may relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A method of controlling an electric motor, the method comprising:
   pulsing the electric motor at a modulation frequency to reduce a duty cycle of the electric motor and to increase efficiency of the electric motor; and
   phase shifting the modulation frequency between 0 degrees (0 radians) and 180 degrees ($\pi$ radians) to reduce vibrations induced in driven equipment.

2. The method according to claim 1, wherein the phase shifting occurs when the modulation frequency is within a resonance range of the driven equipment.

3. The method according to claim 2, wherein the resonance range is defined within 10 Hertz (Hz) of a resonance frequency of the driven equipment.

4. The method according to claim 1, further comprising varying the modulation frequency to generate a target torque.

5. The method according to claim 1, wherein phase shifting the modulation frequency occurs when the modulation frequency is below 100 Hz.

6. The method according to claim 1, wherein phase shifting includes phase shifting the modulation frequency at a shifting frequency.

7. The method according to claim 6, wherein phase shifting the modulation frequency includes the shifting frequency being greater than the modulation frequency.

8. The method according to claim 1, further comprising time shifting peaks of the phase shifted modulation frequency to level torque delivery.

9. A non-transitory computer-readable medium having instructions stored thereon that, when executed by a controller, cause the controller to:
   pulse an electric motor at a modulation frequency to reduce a duty cycle of the electric motor to deliver a target torque and increase efficiency of the electric motor; and phase shift the modulation frequency between 0 degrees (0 radians) and 180 degrees (π radians) to reduce vibrations resulting from pulsing the electric motor.

10. The non-transitory computer-readable storage medium according to claim 9, wherein the phase shifting occurs when the modulation frequency is within a resonance range of a structure to which the electric motor is mounted or a component driven by the electric motor.

11. The non-transitory computer-readable storage medium according to claim 9, wherein phase shifting the modulation frequency occurs when the modulation frequency is below 100 Hz.

12. The non-transitory computer-readable storage medium according to claim 9, wherein phase shifting includes phase shifting the modulation frequency at a shifting frequency.

13. The non-transitory computer-readable storage medium according to claim 12, wherein phase shifting the modulation frequency includes the shifting frequency being greater than the modulation frequency.

14. The non-transitory computer-readable storage medium according to claim 9, wherein the instructions further cause the controller to time shift peaks of the phase shifted modulation frequency to level torque delivery.

15. A controller to operate an electric motor to rotate a driven component, the controller comprising:

a processor; and
a memory including a program to cause the processor to:
pulse the electric motor at a modulation frequency to reduce a duty cycle and increase efficiency of the electric motor to deliver a target torque to the driven component; and
phase shift the modulation frequency between 0 degrees (0 radians) and 180 degrees (π radians) at a shifting frequency.

16. The controller according to claim 15, wherein the phase shifting occurs wherein the modulation frequency is within a resonance range, the resonance range being stored in the memory of the controller.

17. The controller according to claim 15, wherein the program further causes the processor to vary the modulation frequency to generate a target torque.

18. The controller according to claim 15, wherein phase shifting includes phase shifting the modulation frequency at a shifting frequency.

19. The controller according to claim 15, wherein the program further causes the processor to time shift peaks of the phase shifted modulation frequency to level torque delivery.

20. A drive system comprising:
a structure having at least one resonant frequency;
a driven component;
an electric motor fixed to the structure for rotating the driven component; and
a controller according to claim 15.

* * * * *